United States Patent
Fuke et al.

(10) Patent No.: US 6,785,248 B2
(45) Date of Patent: Aug. 31, 2004

(54) SPREAD SPECTRUM COMMUNICATION METHOD AND SPREAD SPECTRUM COMMUNICATION APPARATUS

(75) Inventors: Naoki Fuke, Saitama (JP); Hiroyasu Ishikawa, Saitama (JP); Hideyuki Shinonaga, Saitama (JP)

(73) Assignee: DDI Corp., Toyko (JP)

( * ) Notice: Subject to any disclaimer, the term of this patent is extended or adjusted under 35 U.S.C. 154(b) by 795 days.

(21) Appl. No.: 09/736,318

(22) Filed: Dec. 15, 2000

(65) Prior Publication Data

US 2001/0004357 A1 Jun. 21, 2001

(30) Foreign Application Priority Data

Dec. 16, 1999 (JP) .............................. 11-357321

(51) Int. Cl.$^7$ ............................ H04Q 7/00; H04B 7/212
(52) U.S. Cl. ...................... 370/329; 370/337; 375/146; 375/299
(58) Field of Search ............................... 370/208, 321, 370/319, 344, 329, 337, 442; 375/130, 140, 141, 146, 299

(56) References Cited

U.S. PATENT DOCUMENTS 6,154,637 A * 11/2000 Wright et al. ................. 455/66
6,633,553 B1 * 10/2003 Hwang ......................... 370/329

OTHER PUBLICATIONS

Patent Abstracts of Japan; Publication No. 1010771 A; Publication Date Apr. 24, 1998; *Abstract*.

Patent Abstracts of Japan; Publication No. 10135870 A; Publication Date: May 22, 1998; *Abstract*.

* cited by examiner

*Primary Examiner*—Duc Ho
(74) *Attorney, Agent, or Firm*—Westerman, Hattori, Daniels & Adrian, LLP

(57) ABSTRACT

In each of communication stations, among all of spread spectrum signal waves having the carrier frequencies separated from each other in units of an integer multiple of the frequency amount R, all the spread spectrum signal waves having the carrier frequencies separated from each other in units of an even-number multiple of the frequency amount R are converged into a first group; all the spread spectrum signal waves that are adjacent to the aforementioned spread spectrum signal waves and that have the carrier frequencies separated in units of an even-number multiple of the frequency amount R are converged into a second group; and the first and the second groups of spread spectrum signal waves are simultaneously transmitted according to orthogonal polarized waves to perform information transmission.

10 Claims, 10 Drawing Sheets

R: FREQUENCY AMOUNT THAT IS DEFINED BY THE INFORMATION RATE

R: FREQUENCY AMOUNT THAT IS DEFINED BY THE INFORMATION RATE

SPREAD SPECTRUM COMMUNICATION METHOD AND SPREAD SPECTRUM COMMUNICATION APPARATUS

BACKGROUND OF THE INVENTION

1. Field of the Invention

The present invention relates to a direct sequence-spread spectrum (DS-SS) communication method and a DS-SS communication apparatus that are used for radio communication.

2. Description of the Related Art

As a method for implementing a high-rate DS-SS communication, a carrier frequency offset-spread spectrum method (which will be referred to as a CFO-SS method, hereinbelow) is disclosed in Japanese Patent Application Laid-Open No. 10-107771 ("Spread-Spectrum Communication Method"; by Ishikawa, Shinonaga, and Kobayashi). The disclosed method is characterized as described below. Either a single or a plurality of communication stations share the identical pseudo-random code series, and thereby perform an independent DS-SS modulation for each of multiple information data streams. Carrier frequencies separated from each other by an integer multiple in units of the frequency amount that is defined by the information baud rate are used, and radio communication is thereby performed for a plurality of the signals each for which a DS-SS modulation has been performed. Thereby, communication can be implemented without interwave interference being caused among a plurality of spread spectrum signals.

FIG. 8 is a conceptual view of the CFO-SS method. According to the CFO-SS method, an information signal to be transmitted is divided into parallel information signals. In FIG. 8, there is shown an example where an information signal is separated into n parallel signals. In the figure, the denotations of the reference numbers are as follows: 70-1 to 70-n: Each denotes a divisional information signal obtained from an original information signal; 71-1 to 71-n: Each denotes a spreading modulator for performing spectrum-spreading for corresponding one of the information signals 70-1 to 70-n according to corresponding one of PN codes 72-1 to 72-n; 72-1 to 72-n: Each denotes the PN code, as mentioned above; 73-1 to 73-n: Each denotes a modulator for performing modulation of a corresponding baseband signal obtained by corresponding one of the aforementioned spreading modulators 71-1 to 71-n, the modulation being performed according to corresponding one of local oscillators 74-1 to 74-n; 74-1 to 74-n: Each denotes the local oscillator, as mentioned above; 75-1 to 75-n: Each denotes a bandpass filter for extracting a frequency component required for transmission from corresponding one of modulated signals; 76: Denotes a synthesizer for equivalently indicating that spread spectrum signals of the individual parallel information signals 70-1 to 70-n are multiplexed and transmitted according to individually unique carrier frequencies; 77: Denotes a bandpass filter for extracting only a frequency component required for demodulation from each of received signals; 78-1 to 78-n: Each denotes a frequency converter for converting an high-frequency signal output from the bandpass filter 77 to a baseband signal by using a signal from corresponding one of local oscillators 79-1 to 79-n; 79-1 to 79-n: Each denotes the local oscillator, as described above; 80-1 to 80-n: Each denotes a demodulator for detecting an information signal from a band-limited received signal; and 81-1 to 81-n: Each denotes an information signal detected by corresponding one of the aforementioned demodulators 80-1 to 80-n.

Thus, the CFO-SS method is characterized such that the information signal from the individual communication station is separated into a set of parallel information signals, and they are modulated according to the DS-SS modulation method using the identical pseudo-random code series. As a result, as shown in FIG. 9, the carrier frequencies are modulated so as to be separated from each other, frequency bands occupied by the spread spectrum signal waves are set so as to overlap with each other, and then the waves are thereby transmitted. At this time, when carrier frequencies separated from each other in units of an integer multiple of the frequency amount R that is defined by the information baud rate are used for each spread spectrum signal wave, a receiver can extract desired waves of which the carrier frequencies are known. This allows desired information to be optimally received and demodulated without interference from other signal waves.

However, the CFO-SS method has problems. The spread spectrum signal wave separated by the frequency amount R is permitted to exist at either one side or two sides of a desired spread spectrum signal wave. In this case, a quality level of transmission lines is reduced because the line is interfered by influences of the adjacent signal wave or waves. The influences are caused by, for example, multipath fading characteristics, band-limitation characteristics with respect to transmission signals, and timing offsets among the spread spectrum signal. To solve these problems, a communication method was proposed as is disclosed in Japanese Patent Application Laid-Open No. 10-135870 ("Spread Spectrum Communication System"; by Ishikawa, Shinonaga, and Kobayashi). The disclosure can be summarized such that, as shown in FIG. 10, every frequency offset is set to an even-number multiple of the frequency amount R, which is defined by the information baud rate; and thereby, the reduction in the quality level of a transmission line is minimized.

As described above, according to the CFO-SS method, the individual communication stations use only the single pseudo-random code, thereby modulates the plurality of spread spectrum signal waves, and performs simultaneous transmission of the plurality of spread spectrum signal waves. This allows the limited frequency bands to be efficiently used, and in addition, allows a simply structured communication apparatus to implement high-speed transmission.

On the other hand, however, the method still arises the problems described below. When the spread spectrum signal wave separated by the frequency amount R exists at either one side or two sides of a desired spread spectrum signal wave, a quality level of transmission lines is reduced because of interference from other signal wave. To prevent the problem, every frequency offset is set to an even-number multiple of the frequency amount R defined by the information baud rate; and thereby, the reduction in the quality level of the transmission lines is minimized to allow the communication to be effected. This method, however, produces other problems. Since every frequency offset is set to an even-number multiple of the frequency amount R that is defined by the information baud rate, the essential information rate characteristics of the CFO-SS method cannot be made the best use. Specifically, compared to the case where every frequency offset is set to an integer multiple of the frequency amount R defined by the information baud rate, the information rate is reduced half.

SUMMARY OF THE INVENTION

An object of the present invention is to provide spread spectrum communication that allows a high-speed transmission to be implemented in a spread spectrum communication method and with a spread spectrum communication apparatus in which either a single or a plurality of communication stations use identical pseudo-random code series, the individual communication stations use different carrier frequencies differing from each other, and implement communication in a state where spectrums of signal waves thereby overlap with each other. In order to accomplish the above object, the present invention is characterized as follows. Among spread spectrum signal waves having carrier frequencies separated from each other in units of an integer multiple of the frequency amount that is defined by the information baud rate, all the spread spectrum signal waves having the carrier frequencies separated from each other in units of an even-number multiple of a frequency amount defined by the information baud rate are converged into a first group. Concurrently, all the spread spectrum signal waves that are adjacent to the aforementioned spread spectrum signal waves and that have the carrier frequencies separated in units of an even-number multiple of the frequency amount R are converged into a second group. Then, the first and the second groups of spread spectrum signal waves are simultaneously transmitted according to orthogonal polarized waves to perform information transmission. Thus, the individual communication stations simultaneously can transmit the maximum number of spread spectrum signal waves that can be theoretically obtained. Therefore, the present invention can provide a spread spectrum communication method and a spread spectrum communication apparatus that allows a high-speed transmission to be implemented.

DETAILED DESCRIPTION OF THE PREFERRED EMBODIMENTS

Hereinbelow, a description will be given of an embodiment of a spread spectrum communication system according to the present invention.

Figure 1:
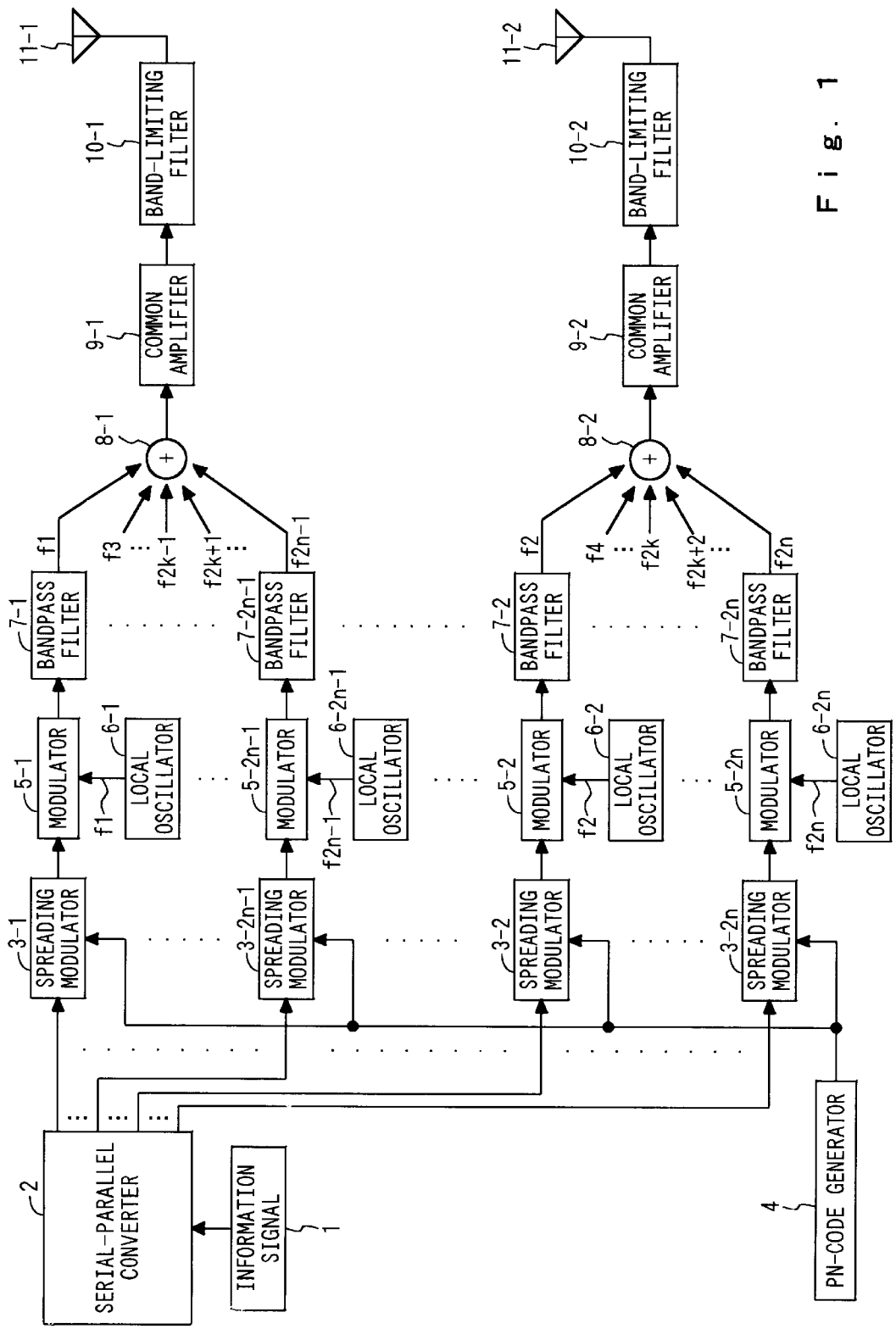
FIG. 1 shows an embodiment of a transmitter configuration for implementing a spread spectrum communication method of the present invention.

FIG. 1 shows an example configuration of a transmitter in a communication station for implementing a spread spectrum communication method of the present invention. The example configuration implements the simultaneous transmission of $2n$ spread spectrum signal waves (Hereinbelow, "n" represents an arbitrary natural number). In the figure, the denotations of the reference numbers are as follows:

1: Denotes an information signal to be transmitted from a communication station;

2: Denotes a serial-parallel converter 2 for serially dividing input data streams to $2n$ output terminals;

3-1 to 3-2n: Each denotes a spreading modulator for performing spectrum-spreading for a stream of information signal according to a PN code provided from a PN-code generator 4;

4: Denotes the PN-code generator, as mentioned above;

5-1 to 5-2n: Each denotes a modulator for performing modulation of a baseband signal obtained by corresponding one of the aforementioned spreading modulators 3-1 to 3-2n, the modulation being performed according to corresponding one of carrier frequencies f1 to f2n of spread spectrum signals;

6-1 to 6-2n: Each denotes the local oscillator for supplying corresponding one of the aforementioned carrier frequency f1 to f2n of the spread spectrum signals;

7-1 to 7-2n: Each denotes a bandpass filter for extracting a frequency component required for transmission from corresponding one of modulated signals;

8-1 and 8-2: Each denotes a signal synthesizer for synthesizing a plurality of spread spectrum signals;

9-1 and 9-2: Each denotes a common amplifier for amplifying a transmission power of a synthesized spread spectrum signal;

10-1 and 10-2: Each denotes a band-limiting filter for reducing out-of-band emission; and 11-1 and 11-2: Each denotes an antenna corresponding to a polarized wave.

In the configuration, output signals of the band-limiting filters 10-1 and 10-2 are emitted from the antennas 11-1 and 11-2, respectively, as a signal wave formed of a vertical polarized wave and a horizontal polarized wave (i.e., an orthogonal polarized wave), or as a signal wave formed of a dextrorotatory-polarized wave and a levorotatory-polarized wave. In stages from the signal synthesizers 8-1 and 8-2 up to the band-limiting filters 10-1 and 10-2, signal processing is performed for each of synthesized signal waves of a plurality of spread spectrum signals that will become identical polarized waves, and outputs of the processing are transmitted with the same clock timing. Although it is not shown in the figure, the configuration may be such that the PN-code generator 4 and local oscillators 6-1 to 6-2n are replaced with each other.

Hereinbelow, a description will be given of the operation of the transmitter in the spread spectrum communication system, as shown in FIG. 1, according to the present invention. Description will be made on the prerequisite conditions that individual spread spectrum signals are transmitted at the same information rate, at the same spread ratio, and with the same clock timing.

The information signal 1 is serially distributed by the serial-parallel converter 2 to a plurality of output ports. The information signals obtained as a result of serial-parallel conversions are serially transmitted to the spreading modulators 3-1 to 3-2n that correspond to individual spread spectrum signals. The transmission is performed according to the clock timing that corresponds to the information baud rate of each of the spread spectrum signals, and concurrently, with the same timing. In each of the spreading modulators 3-1 to 3-2n, the information signal, which is output from the serial-parallel converter 2, is subjected to a spread spectrum modulation that is performed according to a spreading signal with periodicity that is output from the PN-code generator 4. Subsequently, the spread spectrum signal thus obtained is converted to a high-frequency signal in modulators 5-1 to 5-2n that has corresponding one of the carrier frequency f1 to f2n provided from the local oscillators 6-1 to 6-2n as the center frequency. Then, the high-frequency signal is passed through corresponding one of the bandpass filters 7-1 to 7-2n.

Subsequently, to perform polarized-wave orthogonal transmission, spread spectrum signals individually having carrier frequencies separated from each other by an even-number multiple of a frequency amount R that is defined by the information baud rate are converged into groups, and each of the groups is multiplexed on the frequency axis. In the configuration shown in FIG. 1, the spread spectrum signals having the carrier frequencies f1, f3, . . . , f2n−1 and f2, f4, . . . , f2n are converged into one group respectively, and each of the group is multiplexed by signal synthesizer 8-1 and 8-2. Further, each of the signal groups is individually amplified by corresponding one of the common amplifiers 9-1 and 9-2 to a output power that is required for wireless transmission. Subsequently, unusable emission power components are eliminated by corresponding one of the band-limiting filters 10-1 and 10-2 from each of the signals. Finally, each of the multiplexed signals is input to corresponding one of the antennas 11-1 and 11-2 and is emitted therefrom according to a polarized-wave orthogonal transmission method.

Figure 3:
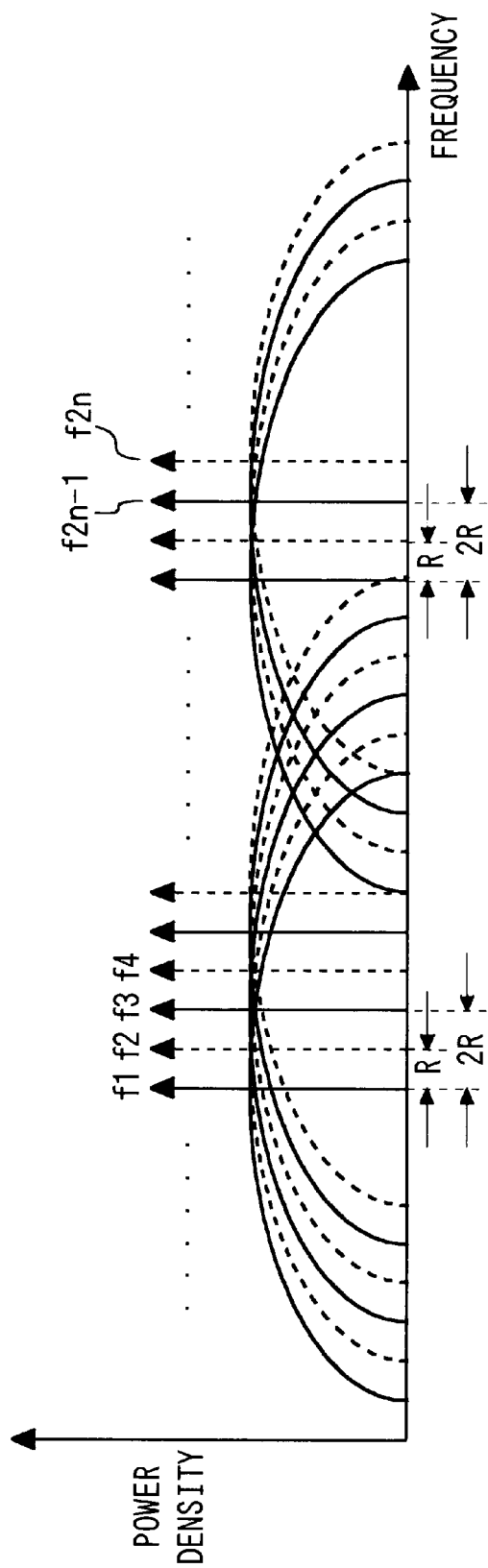
FIG. 3 shows an embodiment of a frequency arrangement of spread-spectrum signal waves according to the S-S communication method of the present invention.

Thus, according to the present embodiment, the orthogonal polarized waves, i.e., the signals each formed of a horizontal polarized wave and a vertical polarized wave, or the polarized waves each formed of a dextrorotatory polarized wave and a levorotatory polarized wave are used and simultaneously transmitted. As shown in FIG. 3, when the identical polarized waves (for example, the polarized waves shown by solid lines) are considered, every frequency offset of the spread spectrum signal waves is set to an even-number multiple 2R of the frequency amount R, which is defined by the information baud rate. This setting prevents the reduction in a quality level of transmission lines, which occurs in the case where every frequency offset is set to an integer multiple of the frequency amount R. Thereby, the improvement in the information rate can be implemented.

Figure 4:
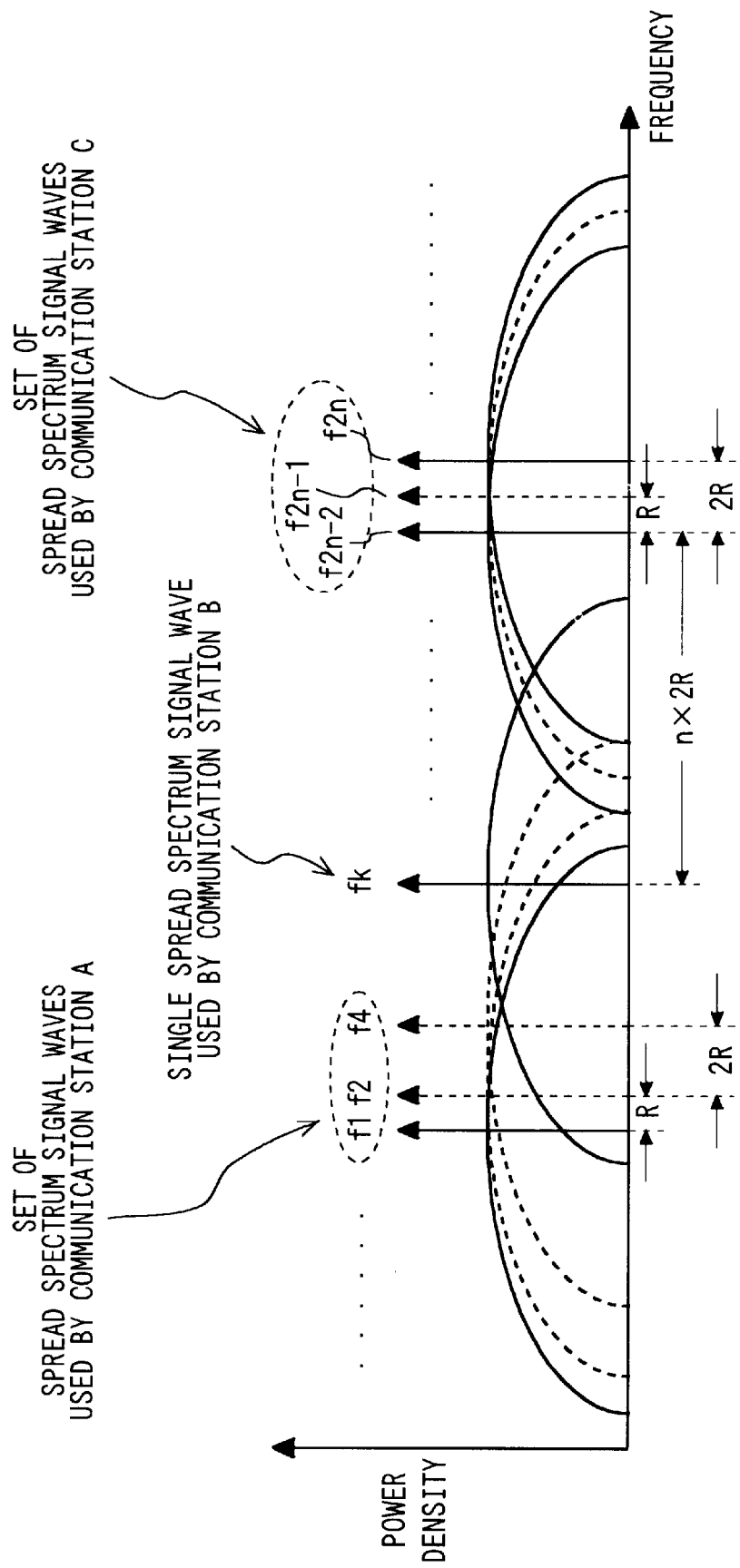
FIG. 4 shows another embodiment of a frequency arrangement of spread-spectrum signal waves according to the S-S communication method of the present invention.

Furthermore, as shown in FIG. 4, according to the configuration of the spread spectrum communication method and apparatus of the present embodiment, each communication station selects either a single spread spectrum signal wave or a plurality of spread spectrum signal waves. Then, the communication station uses the selected spread spectrum signal wave or waves and thereby transmits the information.

According to the above-described circuit configuration, though every frequency offset of the spread spectrum signal waves is set to an integer multiple of the frequency amount R, when the identical polarized waves are considered, every frequency offset is an even-number multiple of the frequency amount R. Therefore, the problem with the conventional CFO-SS method can be solved. Specifically, the interference of the spread spectrum signal waves in each of which the carrier frequencies are separated from each other by the frequency amount that is defined by the information baud rate can be minimized.

Figure 2:
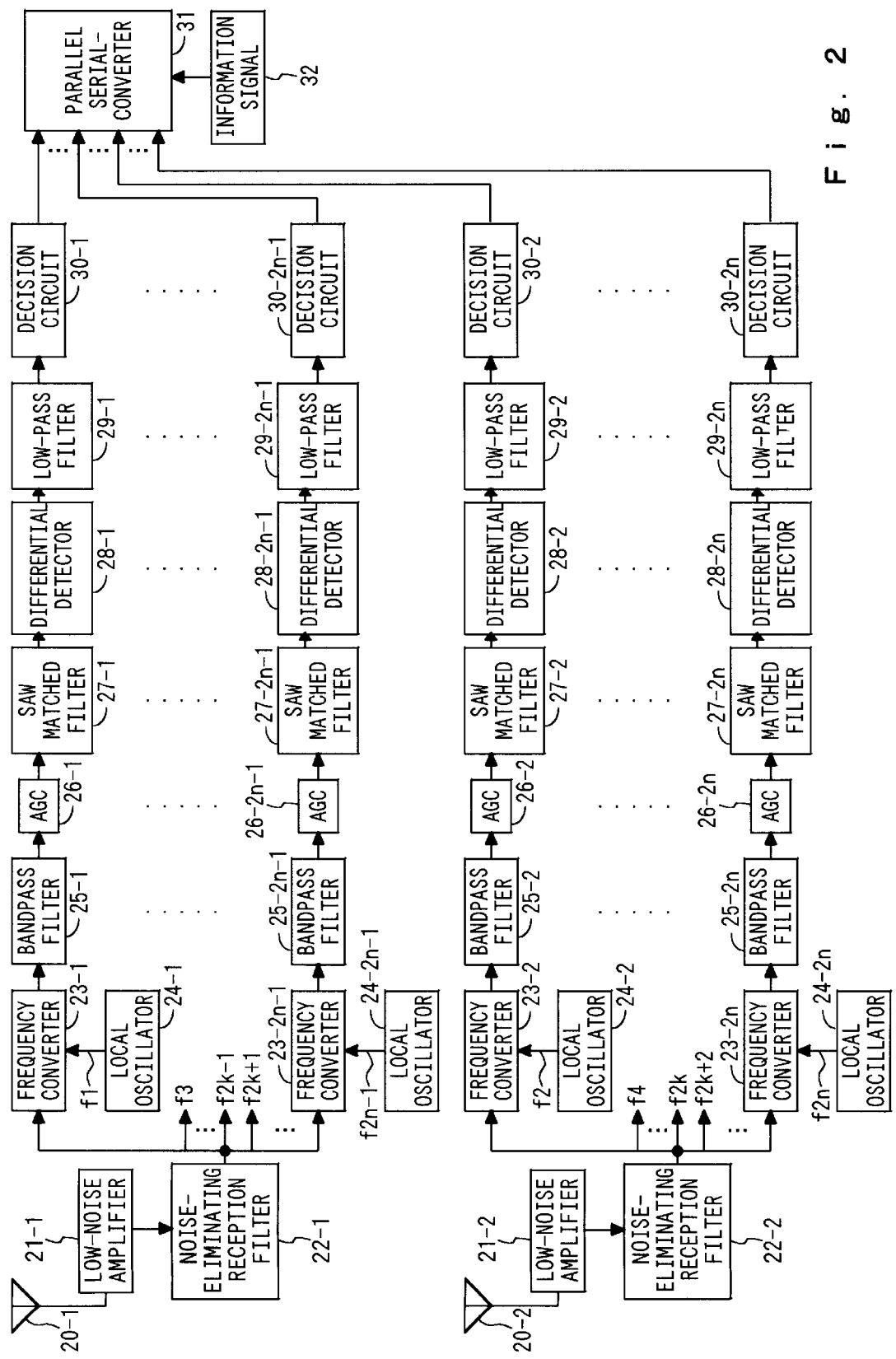
FIG. 2 shows an embodiment of a receiver configuration for implementing the spread spectrum(S-S) communication method of the present invention.

FIG. 2 shows an example configuration of a receiver in a communication station, which implements the DS-SS communication method of the present invention. The figure shows the case where 2n spread spectrum signal waves are simultaneously received. In the figure, the denotations of the reference numbers are as follows:

20-1 and 20-2: Each denotes an antenna corresponding to the polarized wave;

21-1 and 21-2: Each denotes a low-noise amplifier to amplify a received high-frequency signal;

22-1 and 22-2: Each denotes a noise-eliminating reception filter;

23-1 to 23-2n: Each denotes a frequency converter for converting corresponding one of carrier frequencies f1 to f2n of the individual spread spectrum signal waves into an operated center frequency f0 of corresponding one of SAW (surface acoustic wave) matched filters 27-1 to 27-2n of the receiver;

24-1 to 24-2n: Each denotes a local oscillator for generating corresponding one of the carrier frequencies f1 to f2n of the individual spread spectrum signal waves;

25-1 to 25-2n: Each denotes a bandpass filter for eliminating noise components existing out of the frequency-spreading band;

26-1 to 26-2n: Each denotes an automatic gain controller (AGC) for controlling a demodulator to operate in a stable state;

27-1 to 27-2n: Each denotes the aforementioned SAW matched filter for extracting only an information signal component from the spread spectrum signal;

28-1 to 28-2n: Each denotes a differential detector for converting output signal from corresponding one of the aforementioned SAW matched filters 27-1 to 27-2n to a baseband signal;

29-1 to 29-2n: Each denotes a low-pass filter for eliminating a high-frequency-signal component contained in an output signals from one of the differential detectors 28-1 to 28-2n and for extracting only an information-signal component therefrom;

30-1 to 30-2n: Each denotes a decision circuit for deciding an information signal at the peak (decision point) of the output signal from corresponding one of the aforementioned differential detectors 28-1 to 28-2n;

31: Denotes a parallel-serial converter for converting decided information signals to a continuous information signal stream; and

32: Denotes an information signal output from the parallel-serial converter 31. The receiver has the configuration comprising the above components. However, the configuration may be such that digital matched filters are used instead of the SAW matched filters 27-1 to 27-2n.

Hereinbelow, a description will be given of the operation of the receiver in the spread spectrum communication system, shown in FIG. 2, of the present invention.

In order that the spread spectrum signal transmitted from the individual communication station is demodulated in units of one polarized wave, the signals are received by the antennas 20-1 and 20-2 and divided into two signals. Then, the individual spread spectrum signals are input to the low-noise amplifier 21-1 and 21-2. Amplified streams of high-frequency signals are passed through the individual noise-eliminating reception filter 22-1 and 22-2, and are then divided into the number of spread spectrum signals that have been simultaneously transmitted. Subsequently, each of the frequency converters 23-1 to 23-2n converts the frequency of corresponding one of the aforementioned signals into an operated center frequency f0 of corresponding one of the SAW matched filters 27-1 to 27-2n. The conversion is performed using corresponding one of carrier frequencies f1 to f2n provided, respectively, from the local oscillators 24-1 to 24-2n that correspond to the individual spread spectrum signal waves. Each of the signals obtained as a result of the conversion is passed through corresponding one of the bandpass filters 25-1 to 25-2n, and is controlled by corresponding one of the AGCs 26-1 to 26-2n so as to always receive a signal at the same power level from a transmitting station. The signal passed through the corresponding one of the AGCs 26-1 to 26-2n allows corresponding one of the SAW matched filters 27-1 to 27-2n to extract only an information-signal component, and the extracted signal is input to corresponding one of the differential detectors 28-1 to 28-2n. The signal then allows corresponding one of the low-pass filters 29-1 to 29-2n to eliminate a high-frequency-signal component. Subsequently, the signal is detected at the peak of the output signal of corresponding one of the differential detector by decision circuit 30-1 to 30-2n. Concurrently, clocks, such as symbol timing and sampling timing, of the received signal are regenerated. Finally, the decided signal is converted by a parallel-serial converter 31 to the original stream of consecutive information signal 32. In the above, description has been made in the case where the number of the spread spectrum signal waves is 2n. However, the invention can also be implemented in the case of 2n+1 spread spectrum signal waves. In this case, the 2n+1 waves are divided into an n wave group and an n+1 wave group.

As described above, an apparatus formed of the transmitter and the receiver according to the present invention is used to allow each of the communication stations to perform the polarized-wave orthogonal transmission of the plurality of spread spectrum signal waves. This solves the problems that are caused with the conventional method. Specifically, the maximum information rate that can be obtained with the CFO-SS method can be implemented by preventing the interference of the spread spectrum signal waves in each of which the carrier frequencies are separated from each other by the frequency amount, which is defined by the information baud rate.

According to a practical radio system using the CFO-SS method, to prevent the influence of anti-multipath characteristics and band-limitation characteristics, each of the spread spectrum signals is multiplexed using the carrier frequencies equivalent to an integer multiple of the frequency amount that is defined by the information baud rate. By using the method of the present invention, however, the practical system can be improved so as to achieve the maximum theoretical information rate.

In addition, spread spectrum signal waves having a minimum frequency offset are transmitted according to the polarized-wave orthogonal transmission method. Therefore, they can be optimally transmitted without any interference.

Furthermore, a quality level of transmission lines is not reduced, and concurrently, the frequency use efficiency in a specified band can be maximally increased.

Figure 5:
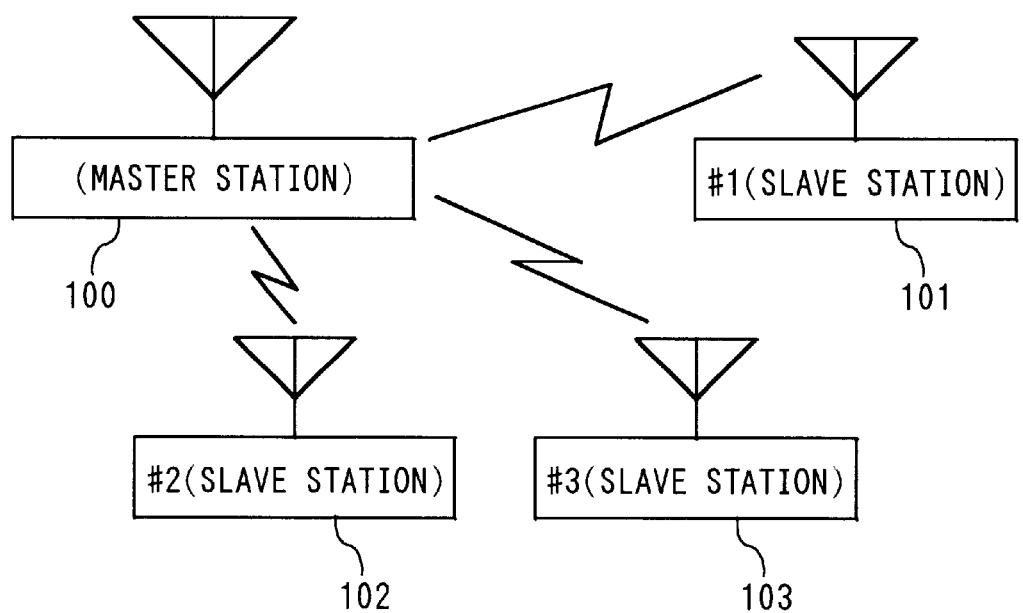
FIG. 5 shows an example configuration of communications system.
Figure 6:
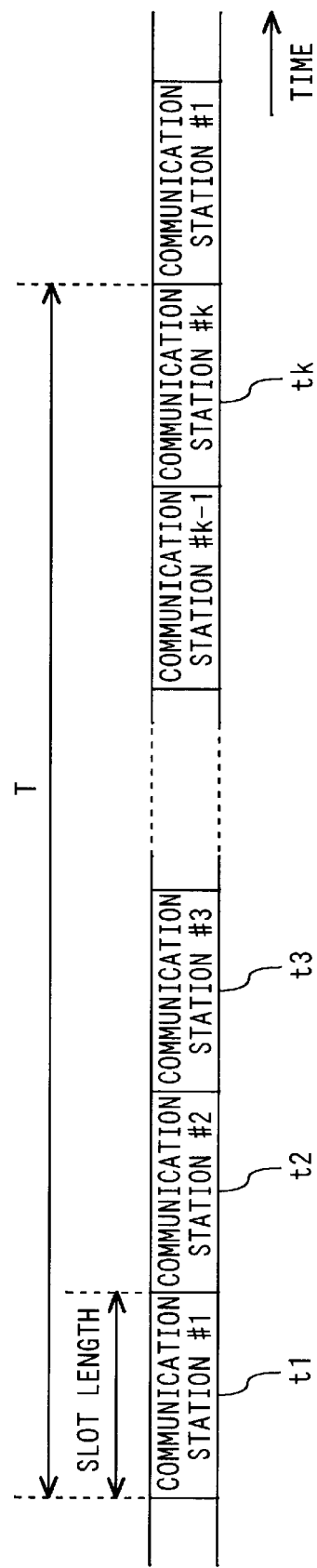
FIG. 6 shows an embodiment of a method that allows individual communication stations according to the S-S communication method of the present invention to implement signal-wave transmission according to a time division multiple access (TDMA) method.

Hereinbelow, a description will be given of a communication method that is implemented among the individual communication stations each comprising the transmitter configuration shown in FIG. 1 and the receiver configuration shown in FIG. 2. FIG. 5 shows an example system configured of a master station and slave stations. FIG. 6 shows a timing chart of signal-wave transmissions performed by individual communication stations according to a time division multiple access (TDMA) method.

A master station 100 divides a frame T into a plurality of time slots t1, t2, t3 . . . , and tk (k represents a natural number), and the time slots t1, t2, t3 . . . , and tk are individually allocated to communication stations, i.e., slave stations. The slave stations individually represented by reference numbers 101, 102, 103, and so on, are capable of performing communication in units of the time slot. In this configuration, for example, the master station 100 is permitted to communicate only with the slave stations 101 in the time slot t1, and is permitted to communicate only with the slave stations 102 in the time slot t2.

As described above, each of the slave stations performs signal-wave communication by making use of a communication band on a time divisional basis on the time axis. This allows the communication band to be used even more efficiently.

Figure 7:
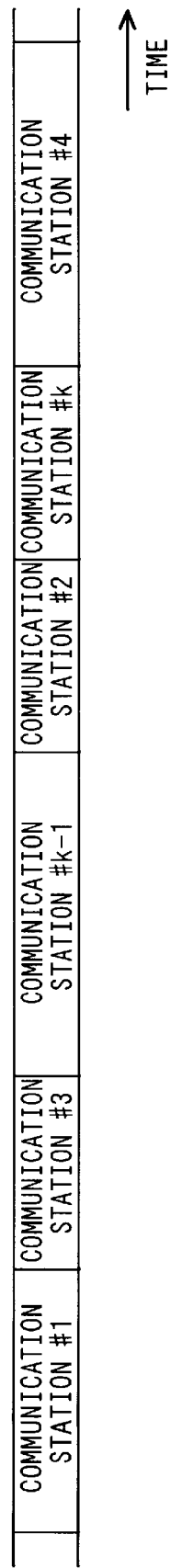
FIG. 7 shows an embodiment of a method that allows a communication station to implement signal-wave transmission while determining whether or not another communication station is performing signal transmission in a specified band according to the S-S communication method of the present invention.
Figure 8:
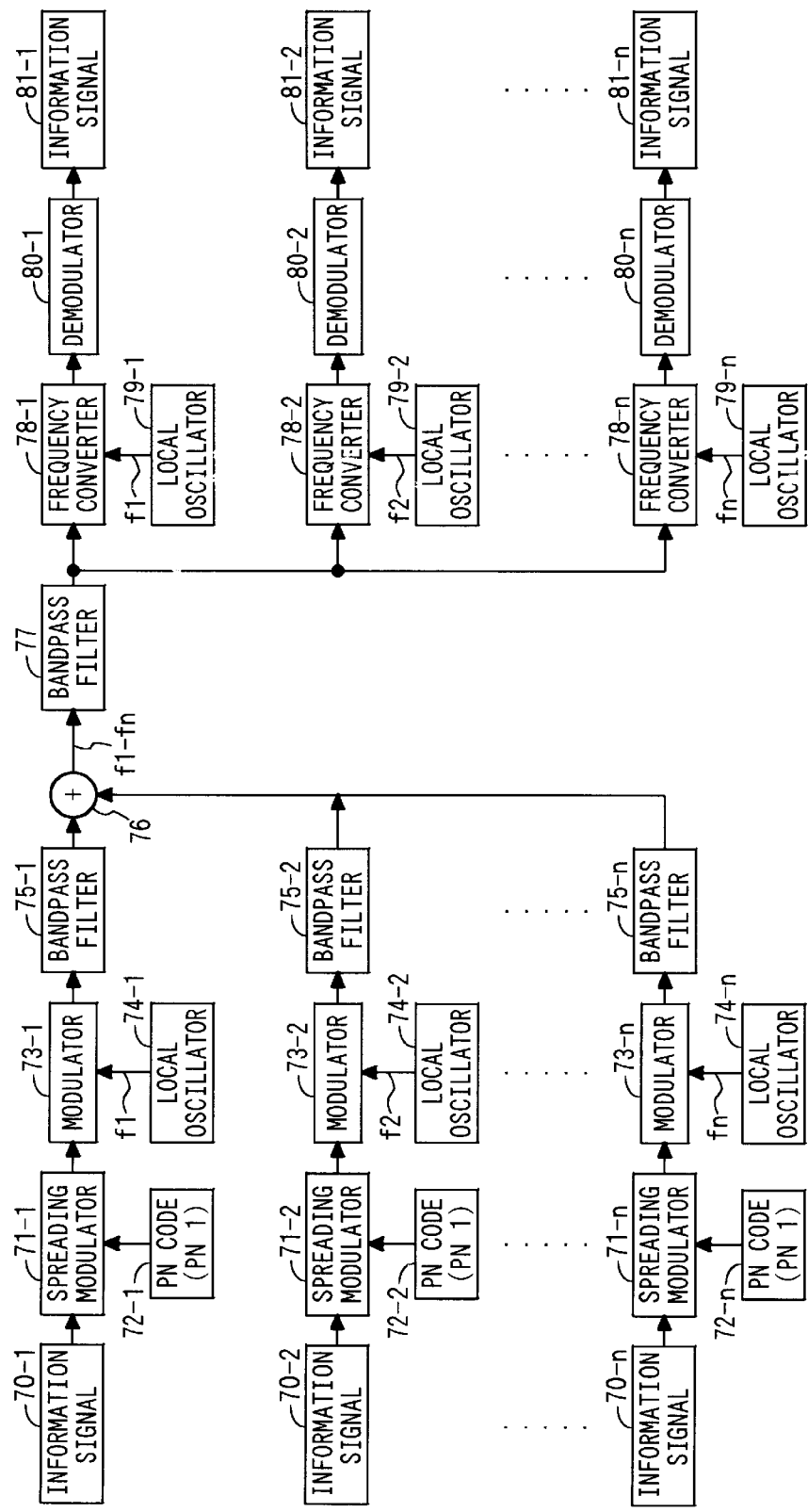
FIG. 8 shows an example configuration of a conventional CFO-SS method.
Figure 9:
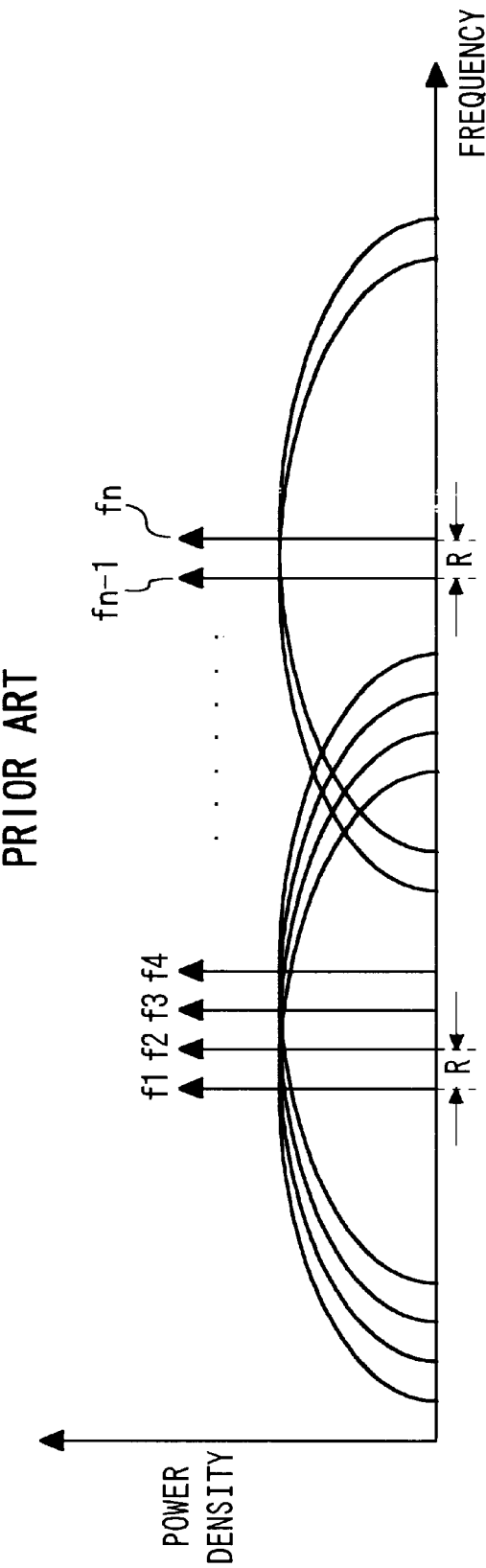
FIG. 9 shows an embodiment of a frequency arrangement of spread-spectrum signal waves according to the conventional CFO-SS method.
Figure 10:
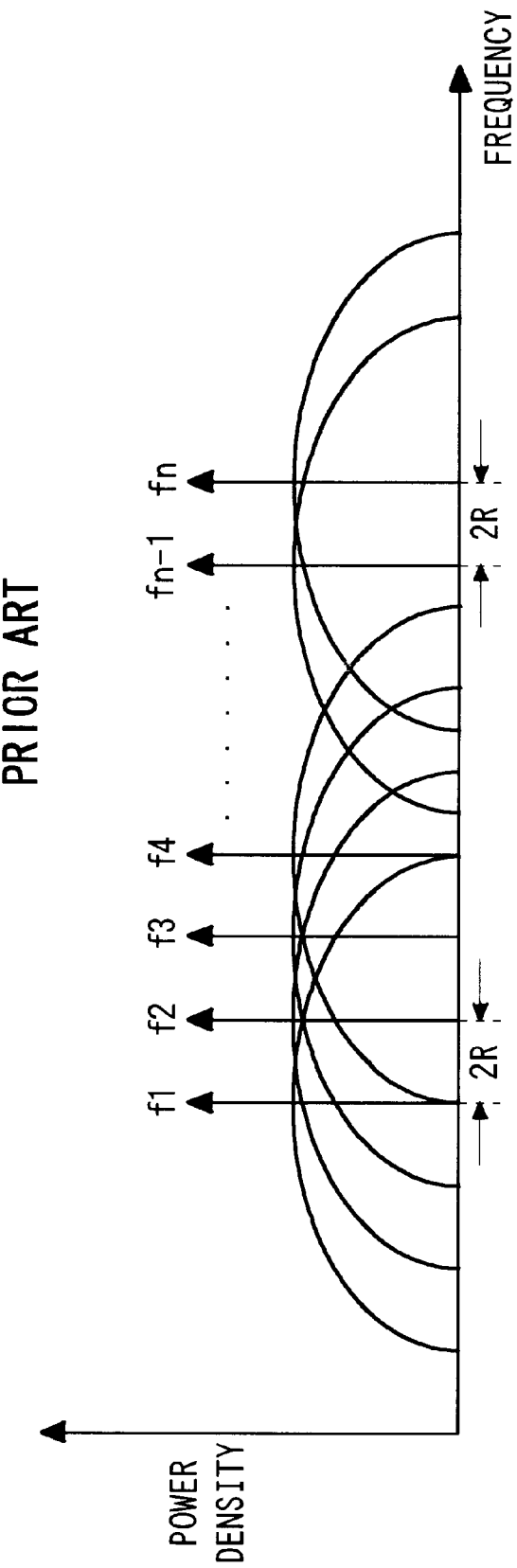
FIG. 10 shows another embodiment of a frequency arrangement of spread-spectrum signal waves according to the conventional CFO-SS method.

FIG. 7 shows a timing chart of another embodiment of communication method. In this embodiment, for example, the master station 100 in FIG. 5 determines whether or not it is permitted to transmit signals to one of the slave stations 101, 102, 103, and so on; and it communicates with one of the slave stations, which is determined to be communicable. Accordingly, the slave stations are accessed at random in both order and time.

Similarly to the embodiment shown in FIG. 6, this communication method allows the communication band to be used even more efficiently.

What is claimed is:

1. A spread spectrum communication method individually performing direct sequence-spread spectrum (DS-SS) modulations of a plurality of information data series by using the same pseudo-random code series, and performing radio communication of a plurality of signals obtained by performing the DS-SS modulations using carrier frequencies separated from each other in units of an integer multiple of the frequency amount R defined by the information baud rate, comprising steps of:

among all of spread spectrum signal waves having the carrier frequencies separated from each other in units of an integer multiple of the frequency amount R in a specified communication-band width, converting all the spread spectrum signal waves having the carrier frequencies separated from each other in units of an even-number multiple of the frequency amount R into a first group; converting all the spread spectrum signal waves that are adjacent to the spread spectrum signal waves and that have the carrier frequencies separated in units of an even-number multiple of the frequency amount R into a second group and;

simultaneously transmitting the first group of spread spectrum signal waves and the second group of spread spectrum signal waves according to orthogonal polarized waves to perform information transmission.

2. A spread spectrum communication method as claimed in claim 1, wherein one or more spread spectrum signal waves are selected in units of the polarized wave, and the selected spread spectrum signal waves are used to perform the information transmission.

3. A spread spectrum communication method as claimed in claim 1, wherein each of communication stations performs the transmission of the spread spectrum signal waves according to a time division multiple access (TDMA) method.

4. A spread spectrum communication method as claimed in claim 2, wherein each of communication stations performs the transmission of the spread spectrum signal waves according to a time division multiple access (TDMA) method.

5. A spread spectrum communication method as claimed in claim 1, wherein one of the communication stations determines whether or not other communication stations is engaged in the signal transmission in a specified band; and if the other communication stations is not engaged in the signal transmission, the communication station performs the signal transmission.

6. A spread spectrum communication method as claimed in claim 5, wherein one of the communication stations determines whether or not other communication stations of the communication stations is engaged in the signal transmission in a specified band; and if the other communication stations is not engaged in the signal transmission, the communication station performs the signal transmission.

7. A spread spectrum communication apparatus, comprising:

a serial-parallel converter for performing division of a plurality of transmission information signals having carrier frequencies f1 to fn into n output terminals (n=arbitrary natural number);

a spreading modulator for performing spectrum-spreading of each information signal obtained by the division according to a PN code;

a signal synthesizer for separating n spread spectrum signals into two groups and individually performing synthesization of the two groups wherein the signal synthesizer synthesizes all of spread spectrum signal waves having the carrier frequencies separated from each other in units of an even-number multiple of the frequency amount R into a first group; and synthesizes all of spread spectrum signal waves that are adjacent to the spread spectrums in the first group and that have the carrier frequencies separated in units of an even-number multiple of the frequency amount R into a second group.

and antennas for individually performing transmission of the two groups according to polarized waves orthogonal to each other.

8. A spread spectrum communication apparatus as claimed in claim 7, wherein the orthogonal polarized waves includes dextrorotatory polarized waves and levorotatory polarized waves.

9. A spread spectrum communication apparatus as claimed in claim 8, further comprising means for converting each of the divided information signals into a high-frequency signal having corresponding one of the carrier frequencies f1 to fn (n=arbitrary natural number) as the center frequency, wherein every frequency offset in the carrier frequencies f1 to fn adjacent to each other is equal to the frequency amount R defined by the information baud rate.

10. A spread spectrum communication apparatus as claimed in claim 7, further comprising means for converting each of the divided information signals into a high-frequency signal having corresponding one of the carrier frequencies f1 to fn (n=arbitrary natural number) as the center frequency, wherein every frequency offset in the carrier frequencies f1 to fn adjacent to each other is equal to the frequency amount R defined by the information baud rate.

* * * * *